US005745816A

United States Patent [19]

Verlinden et al.

[11] Patent Number: 5,745,816

[45] Date of Patent: Apr. 28, 1998

[54] ROLLER FOR USE IN A PHOTOGRAPHIC SHEET MATERIAL PROCESSING APPARATUS

[75] Inventors: Bartholomeus Verlinden, Tongeren; Bart Verhoest, Wilrijk; Jan Claes, Mortsel; Ludo Van Schepdael, Herent, all of Belgium

[73] Assignee: Agfa-Gevaert N.V., Mortsel, Belgium

[21] Appl. No.: 766,191

[22] Filed: Dec. 12, 1996

[30] Foreign Application Priority Data

Dec. 13, 1995 [EP] European Pat. Off. .............. 95203466

[51] Int. Cl.$^6$ .............................................. G03B 3/13

[52] U.S. Cl. .......................... 396/614; 396/624; 396/636; 492/50

[58] Field of Search .................................... 396/564, 584, 396/606, 607, 608, 612, 614, 617, 620, 622, 626, 636; 492/29, 50, 52

[56] References Cited

U.S. PATENT DOCUMENTS

| | | | |
|---|---|---|---|
| 3,593,398 | 7/1971 | Hess et al. | 492/50 |
| 3,698,053 | 10/1972 | Hess et al. | 492/50 |
| 3,945,723 | 3/1976 | Cook et al. | 396/606 |
| 4,158,128 | 6/1979 | Evdokimov et al. | 219/469 |
| 4,166,689 | 9/1979 | Schausberger et al. | 396/614 |
| 4,616,915 | 10/1986 | Norris | 396/617 |
| 4,864,343 | 9/1989 | Nelson | 396/584 |
| 5,048,441 | 9/1991 | Quigley | 428/36.2 |
| 5,108,878 | 4/1992 | Nakamura | 430/421 |
| 5,324,248 | 6/1994 | Quigley | 492/50 |
| 5,583,600 | 12/1996 | Kurowawa et al. | 396/622 |

FOREIGN PATENT DOCUMENTS

| | | |
|---|---|---|
| 8120005 | 6/1986 | Germany . |
| 9220008 | 12/1992 | WIPO . |

OTHER PUBLICATIONS

Patent Abstracts of Japan JP59003435 (Showa Densen Denran KK).

*Primary Examiner*—A. A. Mathews
*Attorney, Agent, or Firm*—Brumbaugh, Graves, Donohue & Raymond

[57] ABSTRACT

A roller, for use in a photographic sheet material processing apparatus, comprises a core (32) provided with a covering of relatively soft material (34). The roller has a length (L) of from 0.4 to 2.0 m. The core has a maximum diameter (D) of less than 0.04*L m. The roller is characterised by having a deflection as measured by a specific test and a weight (W) below levels defined by a specified boundary condition formulae (1) & (2). Rollers satisfying this condition are characterised in that the core is formed of a composite material comprising fibers and a resin matrix. Such rollers have a relatively small diameter, are light and yet still have sufficient stiffness to avoid substantial wrinkling of the sheet material in the apparatus and to satisfy the requirements of high processing quality.

9 Claims, 2 Drawing Sheets

ROLLER FOR USE IN A PHOTOGRAPHIC SHEET MATERIAL PROCESSING APPARATUS

DESCRIPTION

1. Field of the Invention

The present invention relates to a roller suitable for use in a photographic sheet material processing apparatus, in particular such a roller comprising a core provided with a covering of relatively soft material. The present invention relates to rollers which can be used in an apparatus for the wet processing of photographic sheet material, such as X-ray film, pre-sensitised plates, graphic art film and paper, and offset plates.

2. Background of Invention

Apparatus used to process photographic sheet material generally includes rollers to perform various functions, such as transportation of the sheet, removal of excess liquid (i.e. squeegeeing) and minimising leaks from one vessel of the apparatus to another. In order to perform these functions properly, the rollers need to exert a homogeneous pressure over the whole width of the sheet material and the surface of the roller must deform sufficiently to minimise the leak zone at the edges of the sheet material.

As a rule, a processing apparatus for photographic sheet material comprises several vessels each of which contains a treatment liquid, such as a developer, a fixer and a rinse liquid. As used herein, the term sheet material includes not only photographic material in the form of cut sheets, but also in the form of a web unwound from a roll. The sheet material to be processed is transported through these vessels in turn, by transport means in the form of one or more pairs of drive rollers, and thereafter optionally to a drying unit. The time spent by the sheet material in each vessel is determined by the transport speed and the dimensions of the vessel in the sheet feed path direction.

Because the rollers are typically supported at their sides, they must be stiff enough to exert the desired pressure, but on the other hand the roller surface should be resilient enough to prevent leaks. Typically therefore such rollers consist of a rigid core which is covered with a relatively soft material, such as EPDM rubber, polyurethane or thermoplastic materials.

The function of the core is to impart bending stiffness to the roller. The core is usually in the form of a solid rod, or a hollow tube, and is typically formed of a metal such as steel or aluminium. At its ends this core is supported with spindles or bearings. If the core is insufficiently stiff however, some bending occurs with the result that, where a pair of such rollers are biased together to form a nip through which the sheet material passes, the roller surface speed may not be constant across the width of the roller. In particular, when the variation in roller surface speed at the nip is too great, this may result in wrinkling of the sheet material. Wrinkling may cause damage to the sheet material and disturb the kinetics of the processing reactions taking place at the surface of the sheet material.

Because the rollers are subjected to a bending load, for a given core material and construction it is generally the case that the longer the roller length, the greater must be the core diameter. In many cases however it is preferred to work with small diameter rollers in order to achieve a compact apparatus, to enable a modular concept to be used and to reduce the weight of the roller so that handling becomes easier. Small diameter rollers can aid the control of the kinetics of the process, because it enables adjacent pairs of rollers to be positioned more closely together. With large diameter rollers, used for example as squeegee rollers, the roller surface is consequentially larger, and chemical agents in the processing liquids are exposed to oxidation for longer periods of time. This is also a problem if the treatment liquid is not very deep.

OBJECTS OF INVENTION

It is an object of the present invention to provide rollers which have a relatively small diameter, are light and yet still have sufficient stiffness to avoid substantial wrinkling of the sheet material, to guarantee the right pressure distribution and to satisfy the requirements of high processing quality.

SUMMARY OF THE INVENTION

In a first aspect of the invention, we have discovered that rollers of such optimum construction can be obtained if the diameter of the core is below a specified limit and, furthermore, that the roller length, core diameter and covering thickness are such that the deflection of the roller as measured by a specific test and the weight of the roller are below levels defined by specific boundary condition formulae.

Thus, according to a first aspect of the invention, there is provided in an apparatus for the wet processing of photographic sheet material, the provision of at least one small diameter, light weight roller comprising a core provided with a covering of relatively soft material, having a length (L) of from 0.4 to 2.0 m, the core having a maximum diameter (D) of less than 0.04*L m, characterised by being so constructed that the deflection (Δ) of the roller (m) as measured by ASTM D 790M is given by the following boundary condition formula:

$$\Delta < \frac{L^3 C[W - LF]}{\kappa_{23} - \kappa_{24} D} + \frac{\kappa_{22} L^4}{G} \quad (1)$$

wherein:

$$C = \frac{\kappa_3 D^3 - \kappa_4 D^2 + \kappa_5 D - \kappa_6}{\kappa_7 D^6 - \kappa_8 D^5 + \kappa_9 D^4 - \kappa_{10} D^3 + \kappa_{11} D^2 - \kappa_{12} D + \kappa_{13}};$$

$$F = (\kappa_{14} T + \kappa_{15}) D + \kappa_{16} T^2 - \kappa_{17};$$

$$G = \kappa_{18} D^3 - \kappa_{19} D^2 + \kappa_{20} D - \kappa_{21}; \text{ and}$$

$T$ = the maximum thickness of said relatively soft covering (m); and $\kappa_3 = 4.0 * 10^8$; $\kappa_4 = 4.2 * 10^6$; $\kappa_5 = 1.48 * 10^4$; $\kappa_6 = 17.5$; $\kappa_7 = 1.92 * 10^{18}$; $\kappa_8 = 2.02 * 10^{16}$; $\kappa_9 = 9.98 * 10^{13}$; $\kappa_{10} = 2.86 * 10^{11}$; $\kappa_{11} = 4.92 * 10^8$; $\kappa_{12} = 4.84 * 10^5$; $\kappa_{13} = 207$; $\kappa_{14} = 2.69 * 10^3$; $\kappa_{15} = 34.9$; $\kappa_{16} = 2.69 * 10^3$; $\kappa_{17} = 5.24 * 10^{-2}$; $\kappa_{18} = 1.2 * 10^9$; $\kappa_{19} = 5.4 * 10^6$; $\kappa_{20} = 1.08 * 10^4$; and $\kappa_{21} = 8.1$, $\kappa_{22} = 38.4$; $\kappa_{23} = 1.06 * 10^{-3}$; and $\kappa_{24} = 3.03 * 10^{-1}$.

As a consequence of the boundary condition formula (1), the weight (W) of the roller is subject to a maximum, (i.e. when Δ=0), which is given by the boundary condition formula $$W < L\left[F - \frac{\kappa_1 - \kappa_2 D}{GC}\right] \text{(kg)}, \quad (2)$$

wherein $K_1 = 4.07 * 10^{-2}$ and $K_2 = 11.6$; Thus it will be noted that the boundary condition formulae quoted above are such as to impose a maximum weight on the roller and that therefore the present invention defines rollers which are relatively light.

For the sake of clarity, it should be noted that the dimensions D, L and T used in boundary condition formulae (1) and (2) are expressed in metres, giving a deflection in meters and a weight in kilogrammes. For the sake of completeness it may also be noted that the weight W of the roller cannot be negative (hence $0 \leqq W$) and that the deflection will also not be negative (hence $0 \leqq \Delta$).

The length of the roller (L), as the term is used herein, is defined as the length of that part of the core which is covered with the relatively soft covering, minus 0.02 m at each side. This allows for the fact that, in practise, in the ASTM test referred to above, the roller is not supported at its absolute ends, but rather at points situated just before each end. For similar reasons, the weight of the roller is defined as the weight of the core and the covering, cut to the length L, without spindles or bearings.

The invention has advantages in modularity. Where a manufacturer provides a number of processing machines designed for processing sheet material of different widths, it is of advantage if many machine parts are interchangeable. In particular, it is of advantage that the processing rollers have substantially the same diameter. Hitherto, this has only been possible where the diameter of the rollers is substantial. This is because the larger machines, i.e. those designed for processing wider sheet material, need rollers of substantial width in order to ensure the necessary stiffness. However, it is preferred to use rollers of smaller diameter for the reasons set out above. The present invention now makes this possible.

Thus the present invention also provides a family of apparatus for the wet processing of photographic sheet material of different widths, including at least a first apparatus for processing relatively narrow sheet material and a second apparatus for processing relatively wide sheet material, the first and second apparatus each comprising at least one processing roller comprising a core provided with a covering of relatively soft material, having a length (L) of from 0.4 to 2.0 m, the core having a maximum diameter (D) which is, as well for processing relatively narrow sheet materials as for processing relatively wide sheet material of less than 0.04*L m, characterised in that the at least one processing roller of the second apparatus is so constructed that the deflection Δ is as given by boundary condition formula (1).

The present invention has considerable benefit in the design of rollers. By the use of boundary condition formula (1) above, the designer is now able to determine suitable dimensions for the rollers.

The present invention has advantages in the processing of photographic sheet material, in particular that sheet material can pass through a processing apparatus incorporating a roller satisfying the boundary condition formula (1), without significant wrinkling while satisfying the requirements of high processing quality. Thus, according to a further aspect, the invention provides a method for the wet processing of photographic sheet material, comprising passing said photographic sheet material through at least one treatment vessel containing a treatment liquid, said vessel including at least one small diameter, light weight roller having sufficient stiffness to avoid wrinkling of sheet material in use and enabling high processing quality to be achieved, said roller comprising a core provided with a covering of relatively soft material, having a length (L) of from 0.4 to 2.0 m, said core having a maximum diameter (D) of less than 0.04*L m, characterised by being so constructed that the deflection (Δ) of the roller (m) as measured by ASTM D 790M is given by boundary condition formula (1).

The deflection of the roller (Δ) is measured by a 3-point bending test as defined in the ASTM D 790M standard. In this test, the roller rests on two supports and is loaded by means of a loading nose positioned mid-way between the supports. The supports are spaced apart by the length (L) of the roller, as defined herein, and act upon the core, not the covering. Similarly the loading nose acts upon the core. For this purpose the covering needs to be cut away at these locations. It is important to support the roller in such a manner as to ensure that no deformation of the cross-section of the rollers occurs at the support points and at the loading nose. Similarly, it is important to ensure that no local crushing at the support points and at the loading nose occurs. The applied load is equal to the length L of the roller multiplied by 200 N.

The core of the roller preferably has a diameter (D) of between 0.015 m and 0.1 m. While the boundary condition formula (1) relates to the position where the core is solid, it is advantageous if the core of the roller is hollow, since this helps to reduce the weight of the roller. However the thickness of material used for the roller core should not be reduced to the point where the deflection of the roller (Δ), as measured by ASTM D 790M rises above the limit referred to above. Alternatively the core may be solid.

The roller may have a diameter ($\phi = D+2T$) which varies along the length thereof. For example, the core has a diameter (D) which increases away from the ends thereof. Alternatively or additionally, the relatively soft covering has a thickness (T) which increases away from the ends thereof. Ideally, the radial dimension profile of such a roller is such in relation to the force applied by the roller to sheet material passing through the nip as to be substantially even over the width thereof.

The radial dimension of the roller ideally decreases towards the ends thereof i.e. a convex profile, especially a parabolic profile.

The relatively soft covering is preferably formed of a material having a Shore A hardness of less than 90 such as between 15 Shore (A) and 90 Shore (A), as measured on the roller surface. This material may be selected from ethylene/propylene/diene terpolymers (EPDM), silicone rubber, polyurethane, thermoplastic rubber such as Santoprene (Trade Mark for polypropylene/EPDM rubber), styrene-butyl rubber, nitrile-butyl rubber, PFA and Fluor-Latex (FLC) materials. The elastomeric material covering preferably has a thickness of between 1 mm and 30 mm.

While the core and the relatively soft covering will usually be formed of clearly distinguishable materials, a more complicated layered structure including a plurality of distinguishable materials in the core and/or in the relatively soft covering, is also possible. In such a case, in order to dispel any ambiguity over the measurement of the core diameter, the covering is defined as that outer part of the structure which contributes less than 5% of the bending stiffness to the roller, as determined by ASTM D 790M.

The thickness of the covering (T) is defined as half the difference between the maximum outside diameter (ϕ) of the roller and the maximum core diameter (D). Usually the rollers according to the invention include a covering which is fixed in position, i.e. is secured to the core. In an alternative embodiment however, the covering is in the form of a belt carried over the core of the roller. In such a case, the requirements of the present invention as applied to the covering, apply equally to the belt, the parameter T in this case relating to the thickness of the belt.

In one embodiment of the invention, the diameter (ϕ) of the elastomeric material covering is constant along the length of the roller. Alternatively the roller may have a radial dimension profile which varies along the length thereof. In the latter case, the diameter (ϕ) in the expression $\phi/L$ is the maximum diameter. In a preferred embodiment, the thickness of the elastomeric material covering varies along the length of the roller. Alternatively or additionally, the diameter of the core varies along the length thereof.

We have found that the conditions imposed by the present invention are not easily met by known rollers formed, for example, of aluminium or steel. However, we have found that the conditions expressed above in boundary condition formula (1), can be satisfied when the core is formed of a composite material comprising fibers and a resin matrix.

Thus according to a second aspect of the invention, there is provided a roller, for use in a photographic sheet material processing apparatus, comprising a core provided with a covering of relatively soft material, having a length (L) of from 0.4 to 2.0 m, said core having a maximum diameter (D) of less than 0.4*L m, characterised in that the core is formed of a composite material comprising fibres and a resin matrix.

As an illustration of the benefits of the invention, it may be noted, for example, that in one embodiment of the invention where the core is formed of a composite material, the length (L) of the roller is about 1.5 m, the core external diameter (D) is about 0.04 m, and the elastomeric covering thickness is about 0.006 m, the weight (W) of the roller has been found to be about 3.4 kg, significantly lower than the limit of about 5.8 kg determined from the boundary condition formula (1), while where the core is formed of stainless steel, the weight (W) of the roller has been found to be about 12 kg, significantly higher than the limit of about 5.8 kg determined from the boundary condition formula (1).

The fibres are preferably selected from carbon fibres, boron fibres, silicon carbide fibres, and mixtures thereof, although other fibres such as glass fibres, aramid fibres, polyamide fibres and natural fibrous materials such as jute may also be used. Preferably the fibres have an average diameter of from 3 μm to 20 μm. The flexural E-modulus of the fibres is preferably greater than 200 GPa, while the core as such preferably has a flexural E-modulus of between 50 GPa and 300 GPa. It is preferred that the flexural E-modulus of the core is substantially constant along the length of the roller.

The majority of the fibres suitably have lengths which extend from one end of the core to the other, although mixtures of long and short fibres can be used. In fact, the maximum length of the fibres can be somewhat greater than the length of the core where the fibres are twisted. Where the core has a circular cross-section, as will usually be the case, the majority of the fibres preferably extend in a direction generally parallel to the axis of the core, although it is of advantage if at least some of the fibres extend in a generally circumferential direction.

The fibres may constitute from 30% to 70% by volume of the composite material, although a higher packing fraction is possible with fibres of mixed diameter.

The resin is preferably selected from thermo-setting and thermoplastic polymers, and mixtures thereof, such as epoxy resins, furane resins, silicone resins, polyester resins, phenolic resins, vinylester resins, polyamide (PA) resins, polypropylene (PP) resins, polyethylene resins (PE), polyethylene terephthalate resins (PETP), polybutylene terephthalate resins (PBT), and polyphenyloxide resins (PPO).

In a conventional processing apparatus the sheet material is transported along a generally horizontal feed path, the sheet material passing from one vessel to another usually via a circuitous feed path passing under the surface of each treatment liquid and over dividing walls between the vessels. However, processing machines having a substantially vertical orientation have also been proposed, in which a plurality of vessels are mounted one above the other, each vessel having an opening at the top acting as a sheet material inlet and an opening at the bottom acting as a sheet material outlet or vice versa. In the present context, the term "substantially vertical" is intended to mean that the sheet material moves along a path from the inlet to the outlet which is either exactly vertical, or which has a vertical component greater than any horizontal component. The use of a vertical orientation for the apparatus leads to a number of advantages. In particular the apparat us occupies only a fraction of the floor space which is occupied by a conventional horizontal arrangement. Furthermore, the sheet transport path in a vertically oriented apparatus may be substantially straight, in contrast to the circuitous feed path which is usual in a horizontally oriented apparatus. As a consequence of the straight path, the material sensitivity to scratches becomes independent of the stiffness and thickness of the material.

In a vertically oriented apparatus, it is important to avoid, or at least minimise, leakage of treatment liquid from one vessel to another and carry-over as the sheet material passes through the apparatus. United States patent U.S. Pat. No. 4,166,689 (Schausberger et al. assigned to Agfa-Gevaert AG) describes such an apparatus in which liquid escapes from the lower opening and is intercepted by the tank of a sealing device with two squeegees located in the tank above a horizontal passage in line with the lower opening. One or more pairs of drive rollers in the vessel close the lower opening and also serve to transport the sheet material along a vertical path which extends between the openings of the vessel.

When processing sheet material such as films and plates, the sheet material passes between pairs of rollers which are usually biased towards each other to define a nip therebetween. As the sheet material leaves a given liquid treatment vessel it is necessary to remove any liquid carried on the sheet material as efficiently as possible, to prevent carry-over of liquid into a next treatment vessel and to reduce edge effects which arise from non-homogeneous chemistry on the sheet material after squeegeeing. This applies whether the apparatus is of a horizontal or vertical configuration. To do this job properly, the rollers must exert a sufficient and homogeneous pressure over the whole width of the sheet material. Also, to reduce edge effects, it is desirable that the opposite roller surfaces are in contact with each other beyond the edges of the sheet material. To put this problem in context, rollers used in conventional processing apparatus for example have a length of 400 mm or more and a diameter of from 10 to 100 mm. The sheet material typically has a width of from a few millimeters up to 2 m and a thickness of 0.05 mm to 0.5 mm. In view of the nature of elastomeric material, it is in fact impossible to totally eliminate any gap between the roller surfaces at the edges of the sheet material as it passes through the nip. It is desirable that the roller surfaces be in contact with each other within as short a distance as possible from the edges of the sheet material i.e. that the size of the leak zone should be minimised. It is important however that the force between the rollers is sufficient to prevent leakage when no sheet material is passing through. However, the force must not be so high as to risk physical damage to the sheet material as it passes through the nip.

The roller according to the invention may be incorporated in an apparatus for the wet processing of photographic sheet material comprising at least one treatment vessel having upper and lower openings, one of the openings constituting a sheet material inlet and the other of the openings constituting a sheet material outlet, the inlet and outlet defining there-between a substantially vertical sheet material path through the vessel, the roller being mounted in the vessel in a rotatable manner and being biased towards a reaction surface to define a nip there-between through which the sheet material path extends and associated with sealing means to retain treatment liquid in the vessel.

The reaction surface towards which the roller is biased to define the nip will usually be another roller, and it is preferred that requirements of the present invention applies to this, second, roller also. Indeed, it will be usual for the two rollers to be identical. It is however also possible that the reaction surface may be formed by a second roller which does not conform to the above requirements, such as for example, a roller having no elastomeric covering, or for the reaction surface to be in the form of a belt or a fixed surface with a low friction coefficient. Where this general description refers to the use of two rollers, both conforming to the requirements of the present invention, it is to be understood that the second roller may be replaced by any other reaction surface, such as those referred to above.

The objective of a minimum leak zone referred to above can be achieved if the ratio of the diameter of the roller to its length is above a critical limit. The ratio ($\phi$/L) of the maximum diameter ($\phi$) of the elastomeric material covering to the length (L) thereof should be at least 0.012, most preferably between 0.03 and 0.06. Where two rollers are provided, preferably both rollers conform to this requirement, although it is possible that the diameters ($\phi$), and therefore the ratios ($\phi$/L), of the two rollers need not be identical.

In a preferred embodiment of the invention, the rollers are substantially equal in length. One or both of the rollers may constitute drive rollers for driving the sheet material along the sheet material path. Alternatively, the rollers may be freely rotating, alternative drive means being provided to drive the photographic sheet material through the apparatus.

The rollers may be biased together by a variety of methods. The rollers may be biased together for example by making use of the intrinsic elasticity of the elastomeric material by the use of fixed roller bearings. Alternatively, use may be made of resilient means such as springs which act on the ends of the roller shafts. The springs may be replaced by alternative equivalent compression means, such as e.g. a pneumatic or a hydraulic cylinder.

Each vessel may be of modular construction and be provided with means to enable the vessel to be mounted directly above or below an identical or similar other vessel. Alternatively, the apparatus may take an integral or semi-integral form. By the term "semi-integral form" we intend to include an apparatus which is divided by a substantially vertical plane passing through all the vessels in the apparatus, particularly the plane of the sheet material path, enabling the apparatus to be opened-up for servicing purposes, in particular to enable easy access to the rollers.

We prefer an apparatus in which each vessel is so constructed as to provide a substantially closed connection between adjacent vessels.

Each vessel of the apparatus may comprise a housing having an upper housing part and a lower housing part, the upper housing part being so shaped in relation to the lower housing part of the next higher vessel as to provide the substantially closed connection between adjacent vessels. For example, the upper and lower housing wall parts may be provided with flanges, means being provided to secure the flange of the upper housing wall part with the flange of the lower housing wall part of the next higher vessel thereby to provide the substantially closed connection. Optionally, a gasket may be positioned between the vessels to improve the reliability of this connection.

In each vessel it is desirable that the sealing of the rollers to the vessel is achieved in a simple and reliable manner.

We therefore prefer a construction in which each of the rollers which close the lower opening of a treatment vessel is in sealing contact along its length, at least between the limits of the nip, with a sealing member.

In a preferred construction of the apparatus, the sealing member is carried on a sealing support, secured within the vessel.

The sealing member material in contact with the associated roller surface may comprise a polymer material such as PTFE (poly tetra fluoro ethylene), POM (polyoxymethylene), HDPE (high density polyethylene), UHMPE (ultra high molecular weight polyethylene) or PA (polyamide).

DETAILED DESCRIPTION OF THE INVENTION

Figure 1:
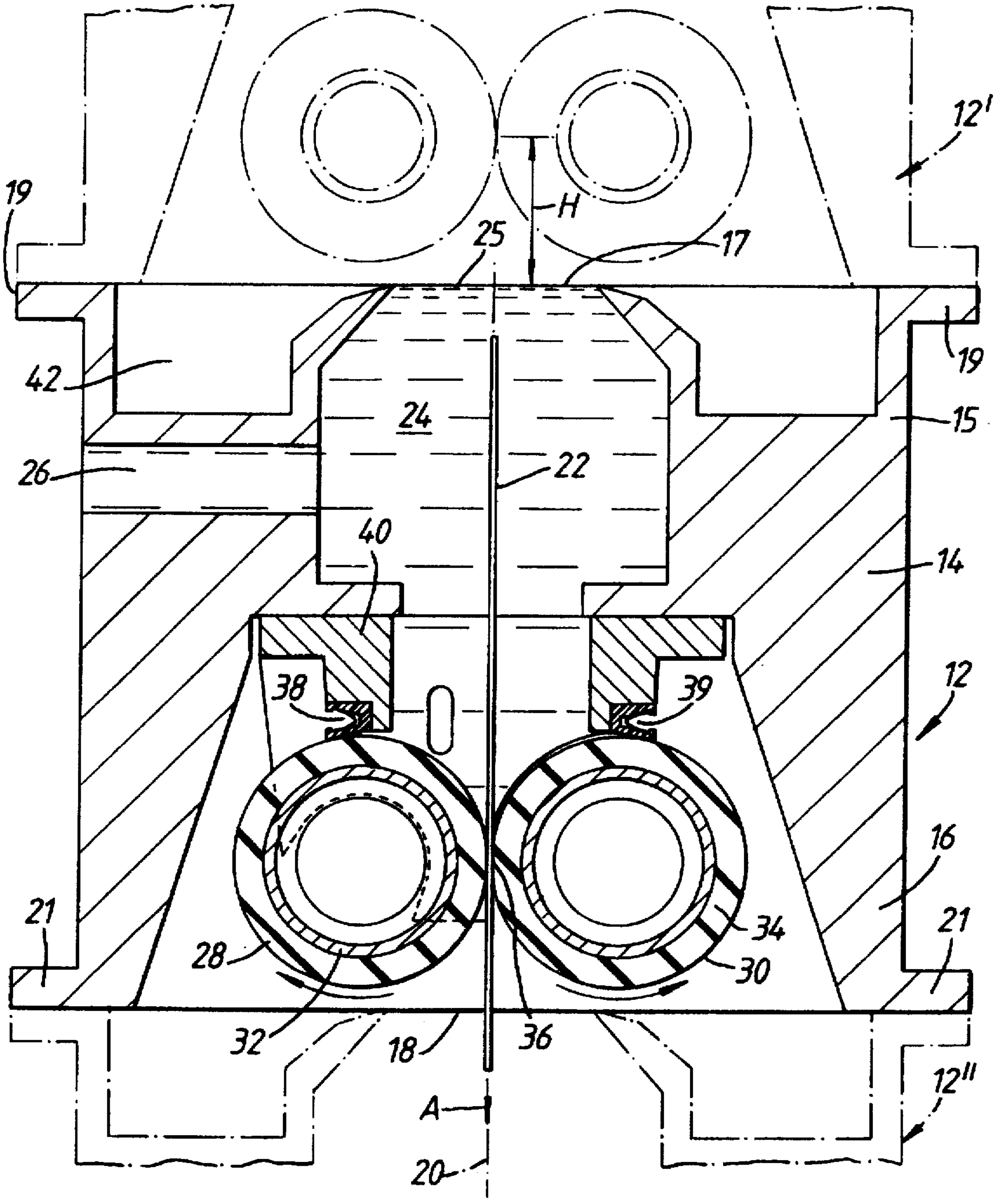
Figure 2:
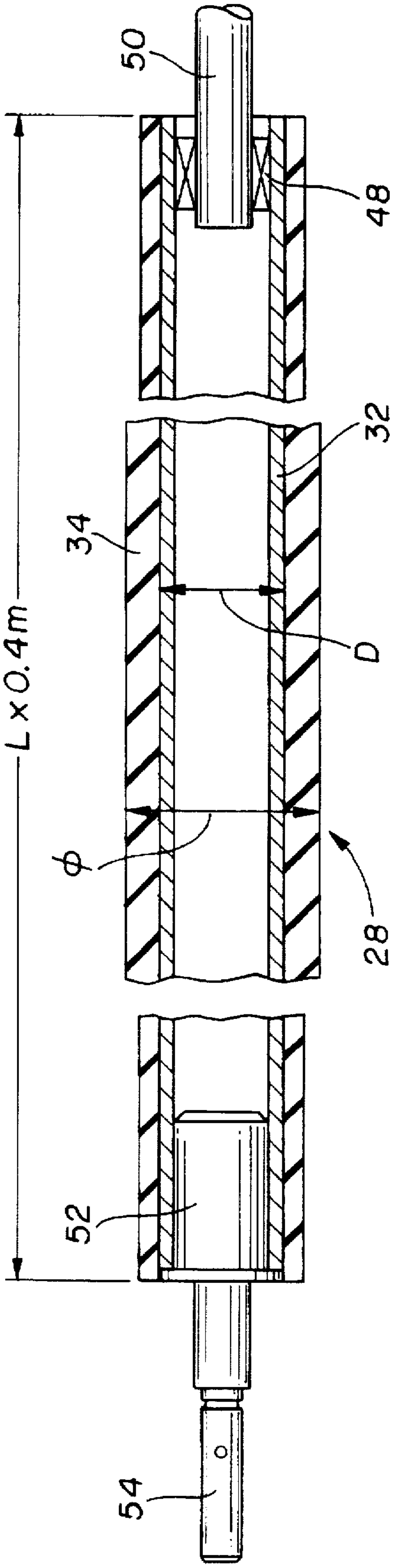

The invention will be described by the following illustrative embodiments with reference to the accompanying drawings without the intention to limit the invention thereto, and in which:

FIG. 1 is, in solid lines, a cross-sectional view of one vessel of a vertical processing apparatus according to the invention, with adjacent vessels being partly shown in broken lines; and FIG. 2 is a longitudinal cross-sectional view showing the detail of the construction of one roller used in the vessel shown in FIG. 1.

The apparatus for the wet processing of photographic sheet material such as X-ray film as shown in the FIG. 1 comprises a plurality of treatment vessels mounted one above another. These vessels may be arranged to provide a sequence of steps in the processing of sheet photographic material, such as developing, fixing and rinsing. The vessels may be of a modular structure as shown or may be part of an integral apparatus.

As shown in FIG. 1, each vessel 12 comprises a housing 14 which is of generally rectangular cross-section and is so shaped as to provide an upper part 15 having an upper opening 17 and a lower part 16 having a lower opening 18. The upper opening 17 constitutes a sheet material inlet and the lower opening 18 constitutes a sheet material outlet. The inlet and outlet define there-between a substantially vertical sheet material path 20 through the vessel 12, the sheet material 22 moving in a downwards direction as indicated by the arrow A. The sheet material preferably has a width which is at least 10 mm smaller than the length of the nip, so as to enable a spacing of at least 5 mm between the edges of the sheet and the adjacent limit of the nip, thereby to minimise leakage. Each vessel 12 may contain treatment liquid 24, a passage 26 in the housing 14 being provided as an inlet for the treatment liquid 24. The lower opening 18 is closed by a pair of rotatable rollers 28, 30 carried in the apparatus.

Each roller 28, 30 is of the squeegee type comprising a stainless steel hollow core 32 carrying an elastomeric covering 34. The core 32 is in cylindrical form having constant internal and external diameters along the length thereof. The rollers 28, 30 are biased towards each other with a force sufficient to effect a liquid tight seal but without causing damage to the photographic sheet material 22 as it passes there-between. The line of contact between the rollers 28, 30 defines a nip 36. The rollers 28, 30 are coupled to drive means (not shown) so as to constitute drive rollers for driving the sheet material 22 along the sheet material path 20.

Each roller 28, 30 is in sealing contact along its length, with a respective stationary sealing member 38, 39 carried on a sealing support 40, which in turn is secured to the housing 14 of the vessel 12, the treatment liquid 24 being retained in the vessel 12 by the rollers 28, 30 and the sealing members 38, 39. The sealing members 38, 39 are formed of PTFE. The sealing members 38, 39 are secured to the sealing support 40 by a suitable, water- and chemical-resistant adhesive, such as a silicone adhesive.

The upper and lower housing parts 15, 16 are provided with flanges 19, 21 respectively to enable the vessel 12 to be mounted directly above or below an identical or similar other vessel 12', 12", as partly indicated in broken lines in FIG. 1. The upper housing part 15 is so shaped in relation to the lower housing part 16 as to provide a substantially closed connection between adjacent vessels. Thus, treatment liquid from vessel 12 is prevented from falling into the lower vessel 12" by the rollers 28, 30 and sealing members 38, 39, while vapours from the lower vessel 12" are prevented from entering the vessel 12 or escaping into the environment. This construction has the advantage that the treatment liquid in one vessel 12 is not contaminated by contents of the adjacent vessels and that by virtue of the treatment liquids being in a closed system evaporation, oxidation and carbonization thereof is significantly reduced.

The upper part 15 of the housing 14 is so shaped as to define a leakage tray 42. Any treatment liquid which may pass through the roller nip of the next higher vessel 12', in particular as the sheet material 22 passes therethrough, drips from the rollers of that vessel and falls into the leakage tray 42 from where it may be recovered and recirculated as desired. The distance H between the surface 25 of the liquid 24 and the nip of the rollers of the next upper vessel 12' is as low as possible.

The construction of roller 28 is shown in more detail in FIG. 2. The construction of roller 30 is similar. The roller 28 comprises a core 32 having a maximum outside diameter (D) of 0.038 m and an internal diameter of 0.016 m. The core 32 has a flexural E-modulus of 220 GPa. The core 32 is provided with a covering 34 of EPDM, an elastomer having a hardness of 30 Shore (A). The core 32 has a constant thickness of 0.006 m. The roller 28 has a length (L) of 1.51 m and a maximum overall diameter (ϕ) of 0.05 m. The maximum ϕ/L ratio is therefore approximately 0.032.

FIG. 2 also shows two possible methods of mounting the roller, one at each end thereof. In practice, it will be usual to use one method only at both ends. At the right hand end of FIG. 2, an internal bearing 48 is provided in which a fixed shaft 50 locates, the shaft being fixedly carried in the apparatus. At the left-hand end of FIG. 2, a spindle 52 is fixedly retained in the hollow core 32 and has a spindle end 54 which extends into a bearing (not shown) in the apparatus, or carries a drive wheel thereon. This construction is suitable for that end of the roller which transmits the drive.

EXAMPLES

Example 1

A roller is constructed having a hollow core formed of carbon fibres (Torayca Type M 40, ex Toray Industries Inc., Japan) embedded in a matrix of epoxy resin. The fibres have an average length of 1.55 m and an average diameter of 6.5 μm. The packing level was 65%. The core is provided with an elastomeric covering of EPDM. The roller has a length (L) of 1.51 m (i.e. overall length=1.55 m), the core has an internal diameter of 0.016 m, an external diameter (D) of 0.038 m and the elastomeric covering has a thickness of 0.006 m. For a roller of these dimensions, the factors C, F and G in boundary condition formulae (1) and (2) calculate as follows:

$C=3.753*10^{-6}$;

$F=1.984$;

$G=5.8451*10^{4}$;

with the result that the maximum weight for this roller according to boundary condition formula (2) is 5.75 kg. The weight (W) of the roller was found to be 3.4 kg.

Given this weight for the roller, the maximum deflection Δ for this roller when subjected to the ASTM D 790M test i s $2.9*10^{-3}$ m. The deflection Δ was found to be $0.99*10^{-3}$ m. This example demonstrates that by the use of a core constructed from fibres embedded in a resin matrix, the weight of the roller is acceptably low, while the deflection remains acceptable.

Example 1A

In a first comparative example, a roller is constructed with a core formed of stainless steel, other details remaining the same as in Example 1. The weight (W) of the roller was 12.1 kg and the deflection Δ when subjected to the ASTM D 790M test was $1.07*10^{-3}$ m.

This comparative example demonstrates that by the use of a core constructed from stainless steel, in place of the fibres embedded in a resin matrix used in Example 1, the weight of the roller is unacceptably high.

Example 1B

In a second comparative example, a roller is constructed with a core formed of stainless steel, other details remaining the same as in Example 1, except that the internal diameter of the hollow core is increased, thereby to lower the weight of the roller to approximately that of the roller of Example 1. The weight (W) of the roller was in fact 3.4 kg and the deflection Δ when subjected to the ASTM D 790M test was $3.32*10^{-3}$ m. This comparative example demonstrates that when a core is constructed from stainless steel, in place of the fibres embedded in a resin matrix used in Example 1, and the dimensions of the core are modified to give rise to a weight similar to that of the roller of Example 1, the deflection Δ is unacceptably high.

We claim:

1. In an apparatus for the wet processing of photographic sheet material, the provision of at least one small diameter, light weight roller having sufficient stiffness to avoid wrinkling of sheet material in use and enabling high processing quality to be achieved, said roller comprising a core (32) provided with a covering (34) of relatively soft material, having a length (L) of from 0.4 to 2.0 m, said core having a maximum diameter (D) of less than 0.04*L m, characterised by being so constructed that the deflection (Δ) of the roller (m) as measured by ASTM D 790M is given by the following boundary condition formula:

$$\Delta < \frac{L^3 C[W - LF]}{\kappa_{23} - \kappa_{24} D} + \frac{\kappa_{22} L^4}{G} \quad (1)$$

wherein:

$$C = \frac{\kappa_3 D^3 - \kappa_4 D^2 + \kappa_5 D - \kappa_6}{\kappa_7 D^6 - \kappa_8 D^5 + \kappa_9 D^4 - \kappa_{10} D^3 + \kappa_{11} D^2 - \kappa_{12} D + \kappa_{13}};$$

-continued $$F = (\kappa_{14}T + \kappa_{15})D + \kappa_{16}T^2 - \kappa_{17};$$
$$G = \kappa_{18}D^3 - \kappa_{19}D^2 + \kappa_{20}D - \kappa_{21}; \text{ and}$$

$T$ = the maximum thickness of said relatively soft covering (m);

$W$ = the weight of the roller (kg);

and $\kappa_3 = 4.0 * 10^8$; $\kappa_4 = 4.2 * 10^6$; $\kappa_5 = 1.48 * 10^4$; $\kappa_6 = 17.5$; $\kappa_7 = 1.92 * 10^{18}$; $\kappa_8 = 2.02 * 10^{16}$; $\kappa_9 = 9.98 * 10^{13}$; $\kappa_{10} = 2.86 * 10^{11}$; $\kappa_{11} = 4.92 * 10^8$; $\kappa_{12} = 4.84 * 10^5$; $\kappa_{13} = 207$; $\kappa_{14} = 2.69 * 10^3$; $\kappa_{15} = 34.9$; $\kappa_{16} = 2.69 * 10^3$; $\kappa_{17} = 5.24 * 10^{-2}$; $\kappa_{18} = 1.2 * 10^9$; $\kappa_{19} = 5.4 * 10^6$; $\kappa_{20} = 1.08 * 10^4$; and $\kappa_{21} = 8.1$, $\kappa_{22} = 38.4$; $\kappa_{23} = 1.06 * 10^{-3}$; and $\kappa_{24} = 3.03 * 10^{-1}$.

2. A roller as claimed in claim 1, wherein said core (32) is formed of a composite material comprising fibres and a resin matrix.

3. A roller according to claim 1, having a diameter ($\phi$=D+2T) which varies along the length thereof.

4. A roller according to claim 1, wherein said relatively soft covering (34) is formed of a material selected from ethylene/propylene/diene terpolymers (EPDM), silicone rubber, polyurethane, thermoplastic rubber, polypropylene/EPDM rubber, styrene-butyl rubber and nitrile-butyl rubber.

5. A roller according to claim 2, wherein the majority of said fibres have a length which extends from one end of said core (32) to the other.

6. A roller according to claim 2, wherein said core (32) has a circular cross-section, the majority of said fibres extending in a direction generally parallel to the axis of said core (32).

7. A roller according to claim 2, wherein said resin is selected from thermosetting and thermoplastic polymers, and mixtures thereof.

8. An apparatus for the wet processing of photographic sheet material comprising at least one treatment vessel (12, 12', 12") having upper and lower openings (17, 18), one of said openings constituting a sheet material inlet and the other of said openings constituting a sheet material outlet, said inlet and outlet defining there-between a substantially vertical sheet material path (20) through said vessel, said roller (28) being mounted in said vessel in a rotatable manner and being biased towards a reaction surface (30) to define a nip (36) there-between through which said sheet material path extends and associated with sealing means (38, 39) to retain treatment liquid in said vessel, said roller (28) comprising a core (32) provided with a covering (34) of relatively soft material, having a length (L) of from 0.4 to 2.0 m, said core having a maximum diameter (D) of less than 0.04*L m, characterised by being so constructed that the deflection ($\Delta$) of the roller (m) as measured by ASTM D 790M is given by the following boundary condition formula:

$$\Delta < \frac{L^3C[W - LF]}{\kappa_{23} - \kappa_{24}D} + \frac{\kappa_{22}L^4}{G} \quad (1)$$

wherein:

$$C = \frac{\kappa_3D^3 - \kappa_4D^2 + \kappa_5D - \kappa_6}{\kappa_7D^6 - \kappa_8D^5 + \kappa_9D^4 - \kappa_{10}D^3 + \kappa_{11}D^2 - \kappa_{12}D + \kappa_{13}};$$

$$F = (\kappa_{14}T + \kappa_{15})D + \kappa_{16}T^2 - \kappa_{17};$$
$$G = \kappa_{18}D^3 - \kappa_{19}D^2 + \kappa_{20}D - \kappa_{21}; \text{ and}$$

$T$ = the maximum thickness of said relatively soft covering (m);

$W$ = the weight of the roller (kg);

and $\kappa_3 = 4.0 * 10^8$; $\kappa_4 = 4.2 * 10^6$; $\kappa_5 = 1.48 * 10^4$; $\kappa_6 = 17.5$; $\kappa_7 = 1.92 * 10^{18}$; $\kappa_8 = 2.02 * 10^{16}$; $\kappa_9 = 9.98 * 10^{13}$; $\kappa_{10} = 2.86 * 10^{11}$; $\kappa_{11} = 4.92 * 10^8$; $\kappa_{12} = 4.84 * 10^5$; $\kappa_{13} = 207$; $\kappa_{14} = 2.69 * 10^3$; $\kappa_{15} = 34.9$; $\kappa_{16} = 2.69 * 10^3$; $\kappa_{17} = 5.24 * 10^{-2}$; $\kappa_{18} = 1.2 * 10^9$; $\kappa_{19} = 5.4 * 10^6$; $\kappa_{20} = 1.08 * 10^4$; and $\kappa_{21} = 8.1$, $\kappa_{22} = 38.4$; $\kappa_{23} = 1.06 * 10^{-3}$; and $\kappa_{24} = 3.03 * 10^{-1}$.

9. A method for the wet processing of photographic sheet material, comprising passing said photographic sheet material through at least one treatment vessel containing a treatment liquid, said vessel including at least one small diameter, light weight roller having sufficient stiffness to avoid wrinkling of sheet material in use and enabling high processing quality to be achieved, said roller comprising a core (32) provided with a covering (34) of relatively soft material, having a length (L) of from 0.4 to 2.0 m, said core having a maximum diameter (D) of less than 0.04*L m, characterised by being so constructed that the deflection ($\Delta$) of the roller (m) as measured by ASTM D 790M is given by the following boundary condition formula:

$$\Delta < \frac{L^3C[W - LF]}{\kappa_{23} - \kappa_{24}D} + \frac{\kappa_{22}L^4}{G} \quad (1)$$

wherein:

$$C = \frac{\kappa_3D^3 - \kappa_4D^2 + \kappa_5D - \kappa_6}{\kappa_7D^6 - \kappa_8D^5 + \kappa_9D^4 - \kappa_{10}D^3 + \kappa_{11}D^2 - \kappa_{12}D + \kappa_{13}};$$

$$F = (\kappa_{14}T + \kappa_{15})D + \kappa_{16}T^2 - \kappa_{17};$$
$$G = \kappa_{18}D^3 - \kappa_{19}D^2 + \kappa_{20}D - \kappa_{21}; \text{ and}$$

$T$ = the maximum thickness of said relatively soft covering (m);

$W$ = the weight of the roller (kg);

and $\kappa_3 = 4.0 * 10^8$; $\kappa_4 = 4.2 * 10^6$; $\kappa_5 = 1.48 * 10^4$; $\kappa_6 = 17.5$; $\kappa_7 = 1.92 * 10^{18}$; $\kappa_8 = 2.02 * 10^{16}$; $\kappa_9 = 9.98 * 10^{13}$; $\kappa_{10} = 2.86 * 10^{11}$; $\kappa_{11} = 4.92 * 10^8$; $\kappa_{12} = 4.84 * 10^5$; $\kappa_{13} = 207$; $\kappa_{14} = 2.69 * 10^3$; $\kappa_{15} = 34.9$; $\kappa_{16} = 2.69 * 10^3$; $\kappa_{17} = 5.24 * 10^{-2}$; $\kappa_{18} = 1.2 * 10^9$; $\kappa_{19} = 5.4 * 10^6$; $\kappa_{20} = 1.08 * 10^4$; and $\kappa_{21} = 8.1$, $\kappa_{22} = 38.4$; $\kappa_{23} = 1.06 * 10^{-3}$; and $\kappa_{24} = 3.03 * 10^{-1}$.

* * * * *